(12) United States Patent
Yang

(10) Patent No.: US 7,196,746 B2
(45) Date of Patent: Mar. 27, 2007

(54) PIXEL STRUCTURE AND MANUFACTURING METHOD THEREOF

(75) Inventor: Chien-Sheng Yang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 10/709,090

(22) Filed: Apr. 13, 2004

(65) Prior Publication Data

US 2005/0190312 A1   Sep. 1, 2005

(30) Foreign Application Priority Data

Feb. 27, 2004  (TW) ............................. 93105044 A (51) Int. Cl.
 *G02F 1/1343* (2006.01)
(52) U.S. Cl. ....................................................... 349/39
(58) Field of Classification Search ............ 349/38–39, 349/43
See application file for complete search history.

(56) References Cited

U.S. PATENT DOCUMENTS

| | | | | |
|---|---|---|---|---|
| 5,260,818 A | * | 11/1993 | Wu | 349/55 |
| 5,592,318 A | * | 1/1997 | Majima et al. | 349/122 |
| 5,734,449 A | * | 3/1998 | Jang | 349/39 |
| 6,894,735 B2 | * | 5/2005 | Chae et al. | 349/38 |

* cited by examiner

*Primary Examiner*—James A. Dudek
(74) *Attorney, Agent, or Firm*—Jiang Chyun IP Office (57) ABSTRACT

A pixel structure and fabricating method thereof is provided. The pixel structure includes a scan line, a data line, an active component, a plurality of transparent capacitance electrodes and a pixel electrode. First, an active component, a scan line and a data line are formed over a substrate, wherein the active component is electrically connected to the scan line and the data line. In addition, a plurality of transparent capacitance electrodes are formed over the substrate. Next, a pixel electrode is formed over the transparent capacitance electrode and electrically connected to the active component. Thus, the pixel electrode and the transparent capacitance electrodes constitute a multilayer pixel storage capacitor. Since the pixel storage capacitor is comprised of transparent material, and being a multilayer structure, the capacitance of the pixel storage capacitor and the aperture ratio of the pixel structure respectively are increased.

22 Claims, 7 Drawing Sheets

PIXEL STRUCTURE AND MANUFACTURING METHOD THEREOF

CROSS REFERENCE TO RELATED APPLICATIONS

This application claims the priority benefit of Taiwan application serial no. 93105044, filed Feb. 27, 2004.

BACKGROUND OF INVENTION

1. Field of the Invention

The present invention generally relates to a pixel structure and a manufacturing method thereof. More particularly, the present invention relates to a pixel structure and a manufacturing method thereof having a pixel storage capacitor comprising at least three layers of transparent capacitance electrodes.

2. Description of Related Art

Conventionally, a thin film transistor (TFT) liquid crystal display (LCD) is constructed by TFT array substrate, color filter array substrate and liquid crystal layer. The TFT array substrate is constructed by a plurality of array arranged pixel structures. Each pixel structure includes a thin film transistor (TFT), pixel electrodes and a pixel storage capacitor. The TFT includes gate, channel, drain and source, and is applied as the switching component of liquid crystal display unit. For example, when the pixel electrode is at selecting state (i.e., at "ON" state), the signal is written to the pixel. Alternatively, when the pixel electrode is at non-selecting state (i.e., at "OFF" state), the pixel storage capacitor is maintained at the voltage level for driving the liquid crystal. Therefore, the performance of the liquid crystal display (LCD) is highly dependent on the capacitance of the pixel storage capacitor.

Generally, the pixel storage capacitor of the conventional pixel structure is constructed by a first metal layer (metal 1), a second metal layer (metal 2), a dielectric layer between the first and second metal layer and pixel electrodes. When the pixel storage capacitor is disposed on the gate, it is called Cst on gate, and when the pixel storage capacitor is disposed on the common line, it is called Cst on common. Generally, the gate or the common line (i.e., the first metal layer) is used as an electrode, and the second metal layer and the pixel electrode that are electrically connected with each other are used as another electrode. However, the electrode of the conventional pixel storage capacitor is generally composed of non-transparent metal material. Therefore, the aperture ratio of the pixel structure decreases when the pixel storage capacitor increases, and the brightness of the liquid crystal display (LCD) is also decreased.

Figure 1:
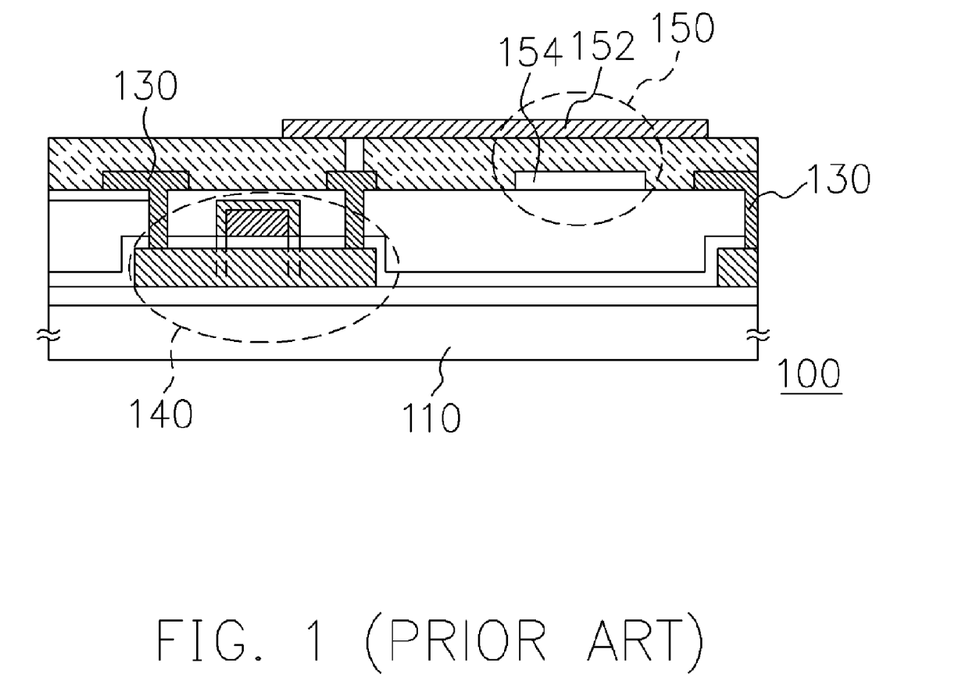
FIG. 1 is a cross-sectional view schematically illustrating a conventional pixel structure.

In order to solve the problems due to decrease in the aperture ratio, another conventional pixel structure is also developed. FIG. 1 is cross-sectional view schematically illustrating a conventional pixel structure. Referring to FIG. 1, the pixel structure 100 is disposed on the substrate 110, wherein the pixel structure 100 includes a scan line (not shown), a data line 130, an active component 140 and a pixel storage capacitor 150. The scan line and the data line 130 are disposed on the substrate 110. The active component 140 is disposed on the substrate at the intersection of the scan line and the data line 130 and electrically connected to the scan line and the data line 130. The pixel storage capacitor 150 includes a pixel electrode 152 and a transparent capacitance electrode 154, wherein the pixel electrode 152 is electrically connected to the active component 140.

Since the pixel electrode 152 and the transparent capacitance electrode 154 of the pixel storage capacitor 150 are composed of transparent materials, the aperture ratio of the pixel structure 100 is not reduced due to the pixel storage capacitor 150. However, in a high resolution liquid crystal display (LCD), the area of the capacitance electrode is reduced, thus the capacitance of the pixel storage capacitor 150 that has only two layers of capacitance electrodes is not sufficient. In order to increase the capacitance of the pixel storage capacitor 150, if the distance between the pixel electrode 152 and the transparent capacitance electrode 154 is reduced, the fabrication of the dielectric layer is not easy.

SUMMARY OF INVENTION

Accordingly, the present invention is directed to a pixel structure having a pixel storage capacitor with high capacitance.

In addition, the present invention is directed to a method of fabricating a pixel structure for increasing the aperture ratio of the pixel structure.

Moreover, the present invention is directed to a method of fabricating a pixel structure using a simplified process steps.

According to an embodiment of the present invention, the pixel structure, for example but not limited to, a scan line, a data line, an active component, a plurality of transparent capacitance electrodes and a pixel electrode. The scan line and the data line are disposed over the substrate. The active component is disposed over the substrate adjacent to the intersection of the scan line and the data line, and active component is electrically connected to the scan line and the data line. The transparent capacitance electrodes are disposed over the substrate. The pixel electrode is disposed over the transparent capacitance electrodes, and the pixel electrode is electrically connected to the active component. Thus, the pixel electrode and the transparent capacitance electrodes constitute a multilayer pixel storage capacitor is constructed.

In one embodiment of the invention, a portion of the transparent capacitance electrodes are electrically connected to the active component, or electrically connected to the active component via the pixel electrode.

In one embodiment of the invention, the active component comprises, for example but not limited to, a low temperature polysilicon (LTPS) thin film transistor (TFT). In addition, the pixel structure further comprises, for example but not limited to, a source/drain conductive layer. The active component is, for example but not limited to, electrically connected to the data line and the pixel electrode via the source/drain conductive layer. Moreover, the pixel structure may further comprise a conductive layer. The active component is, for example but not limited to, electrically connected to the data line via the conductive layer, and the pixel electrode is, for example, electrically connected to the active component directly.

In one embodiment of the invention, the active component is composed of amorphous silicon (a-Si) thin film transistor (TFT). In another embodiment of the invention, the active component comprises, for example but not limited to, a gate, a channel and a source/drain. The gate is, for example, disposed over the substrate and electrically connected to the scan line. The channel is, for example, disposed over the gate. The source/drain is, for example, disposed over the channel and electrically connected to the data line and the pixel electrode.

In one embodiment of the invention, the pixel electrode and the transparent capacitance electrode is composed of, for example but not limited to, indium tin oxide (ITO) or indium zinc oxide (IZO).

In addition, the present invention provides a method of fabricating a pixel structure including, for example, the following steps. First, an active component, a scan line and a data line are sequentially formed over a substrate, wherein the active component is electrically connected to the scan line and the data line. Then, a plurality of transparent capacitance electrodes is formed over the substrate. Next, a pixel electrode is formed over the transparent capacitance electrodes, and electrically connected to the active component. Thus, the pixel electrode and the transparent capacitance electrodes constitute a multilayer pixel storage capacitor.

In one embodiment of the invention, the active component comprises, for example but not limited to, low temperature polysilicon (LTPS) thin film transistor (TFT). In another embodiment of the invention, for example, when the data line is formed, a source/drain conductive layer may be formed over the active component. The active component is, for example, electrically connected to the data line and the pixel electrode via the source/drain conductive layer. In another embodiment of the invention, for example, after the data line is formed, a conductive layer is formed over the active component. The active component is, for example electrically connected to the data line via the conductive layer, and the pixel electrode is, for example, electrically connected to the active component directly. The conductive layer and the pixel electrode is formed, for example but not limited to, by patterning a same material layer. The method of forming the active component comprises the following steps. First, a polysilicon layer is formed over the substrate. Thereafter, an inter-gate dielectric layer is formed over the substrate covering the polysilicon layer. Then, a gate is formed over the inter-gate dielectric layer and the polysilicon layer. Next, a doped source/drain region is formed in the polysilicon layer at both sides of the gate.

In one embodiment of the invention, the method of forming the doped source/drain region comprises, for example, an ion implantation process using the gate as a mask to form a doped source/drain region on both sides of the polysilicon layer.

In one embodiment of the invention, the active component comprises an amorphous silicon (a-Si) thin film transistor (TFT). In another embodiment of the invention, the method of forming the active component comprises, for example, the following steps. First, a gate is formed over the substrate and electrically connected to the scan line. Then, an inter-gate dielectric layer is formed over the substrate covering the gate. Thereafter, a channel is formed over the inter-gate dielectric layer and the gate. Next, a source/drain is formed over the channel.

In one embodiment of the invention, the pixel electrode and the transparent capacitance electrodes is composed of, example but not limited to, indium tin oxide (ITO) or indium zinc oxide (IZO).

Accordingly, the pixel structure and the manufacturing method thereof of the present invention have the following advantages. First, the aperture ratio of the pixel structure is enhanced drastically since the e pixel storage capacitor is comprised of transparent material. In addition, the capacitance of the multilayer pixel storage capacitor is increased. Further, the invention is suitably applied in high resolution liquid crystal display (LCD). Moreover, the manufacturing process of the invention is simple.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The following drawings illustrate embodiments of the invention and, together with the description, serve to explain the principles of the invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
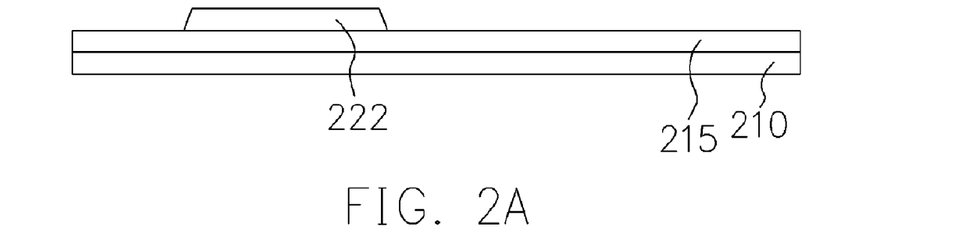
FIG. 2A to FIG. 2H are cross-sectional views schematically illustrating the manufacturing process of a pixel structure according to an embodiment of the present invention.
Figure 2B:
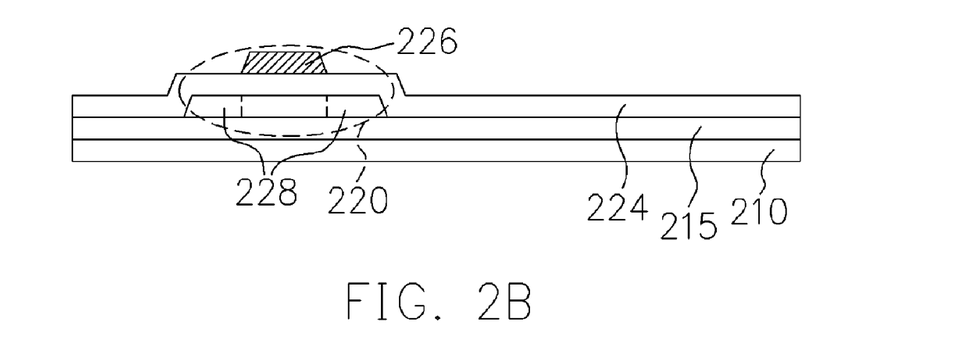

FIG. 2A to FIG. 2H are cross-sectional views schematically illustrating the manufacturing process of a pixel structure according to an embodiment of the present invention. Referring to FIG. 2A and FIG. 2B, first of all, an active component 220 and a scan line (not shown) are formed over a substrate 210. The active component 220 comprises, for example but not limited to, a low temperature polysilicon (LTPS) thin film transistor (TFT). The method of forming the active component 220 comprises, for example but not limited to, the following steps. First of all, a polysilicon layer 222 is formed on the substrate 210. In another embodiment of the invention, before the polysilicon layer 222 is formed, further comprises, for example, forming a buffer layer 215 on the substrate 210 to prevent the polysilicon layer 222 from ion contamination from the substrate 210. The polysilicon layer 222 is formed, for example but not limited to, by annealing the amorphous silicon (a-Si) layer. Thereafter, an inter-gate dielectric layer 224 is, for example, formed over the substrate 210 covering the polysilicon layer 222. Next, a gate 226 over is formed over the polysilicon layer 222 and the inter-gate dielectric layer 224. Next, an implantation process is performed using the gate 226 as a mask to form a doped source/drain region 228 on both sides of the polysilicon layer 222. The gate 226 of the active component 220 is electrically connected to the scan line.

Figure 2C:
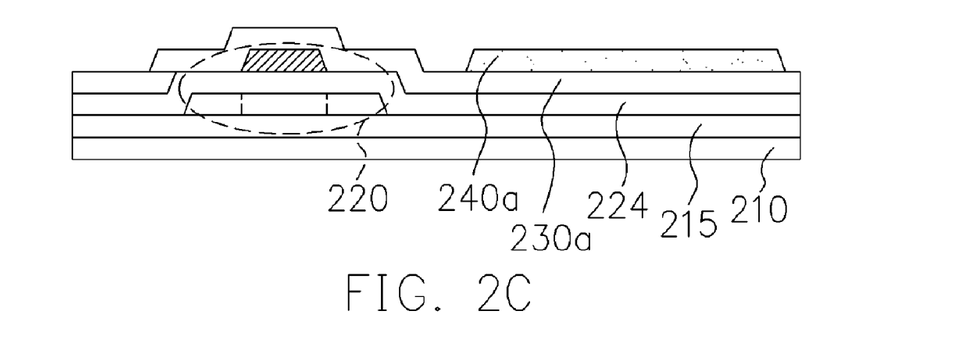

Thereafter, referring to FIG. 2C, for example, a transparent capacitance electrode 240a is formed over the substrate 210. In another embodiment of the invention, before the transparent capacitance electrode 240a is formed, a first protection layer 230a is formed over the substrate 210 covering the active component 220.

Figure 2D:
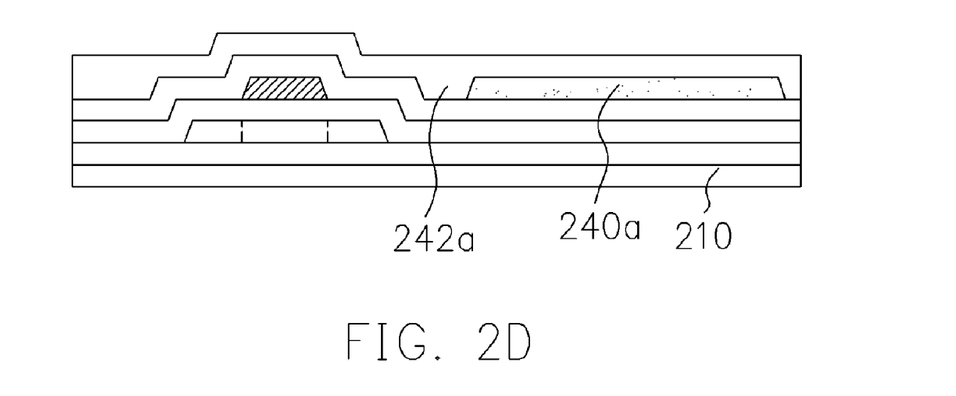

Thereafter, referring to FIG. 2D, for example, a first dielectric layer 242a is formed over the substrate 210 covering the transparent capacitance electrode 240a.

Figure 2E:
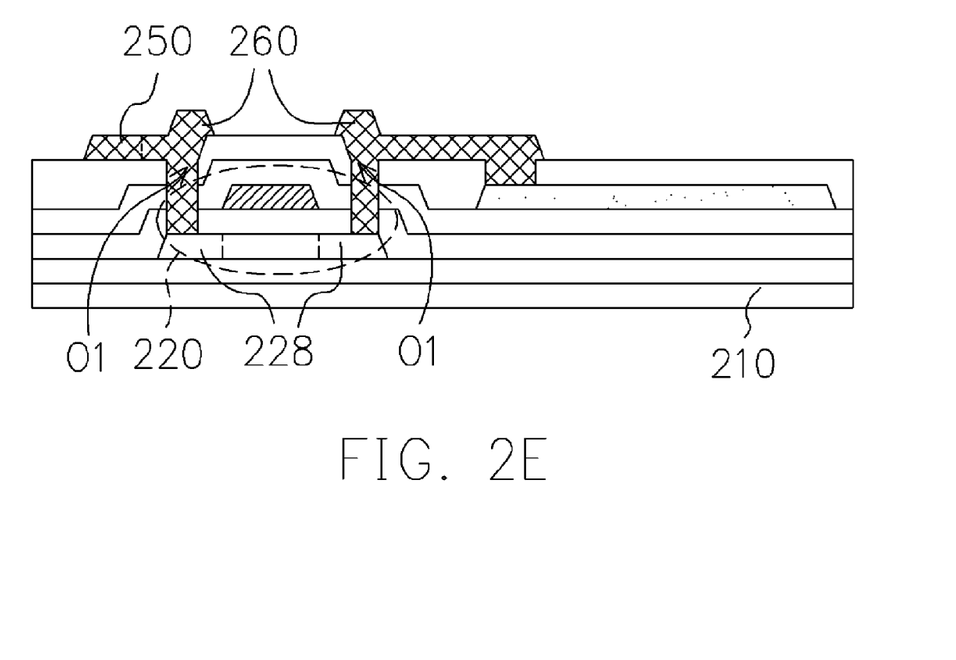

Thereafter, referring to FIG. 2E, for example, a plurality of first contact window openings O1 is formed over the doped source/drain region 228 of the active component 220 by performing well known photolithography and etching process. Thereafter, a data line 250 and a source/drain conductive layer 260 are formed over the substrate 210 by patterning the same metal layer. The data line 250 is electrically connected to the source/drain conductive layer 260, and the source/drain conductive layer 260 is filled within the first contact window openings O1 to electrically connected to the active component 220.

Figure 2F:
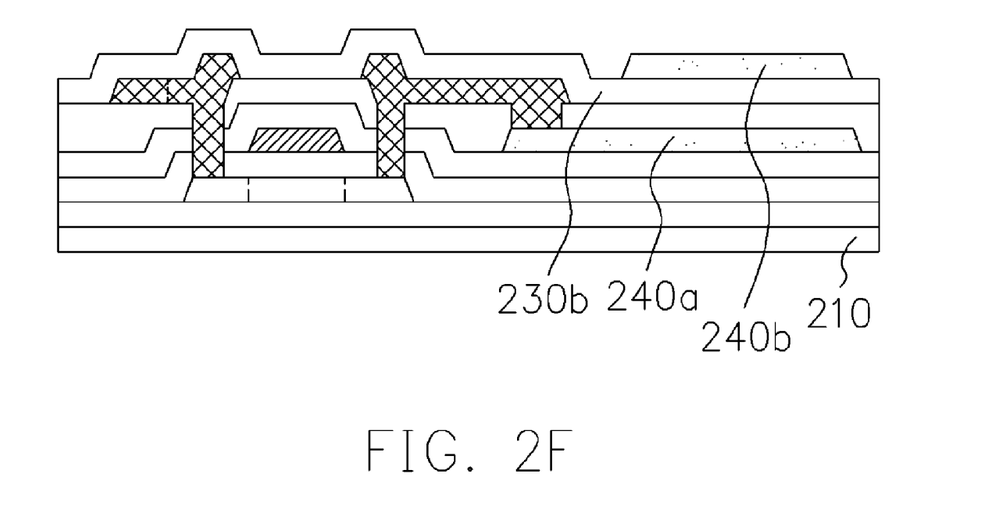

Thereafter, referring to FIG. 2F, for example, another transparent capacitance electrode 240b is formed over the substrate 210 and the transparent capacitance electrode 240a. In another embodiment of the invention, before the transparent capacitance electrode 240b is formed, a second protection layer 230b is formed, for example but not limited to, over the substrate 210 covering the data line 250 and the source/drain conductive layer 260.

Figure 2G:
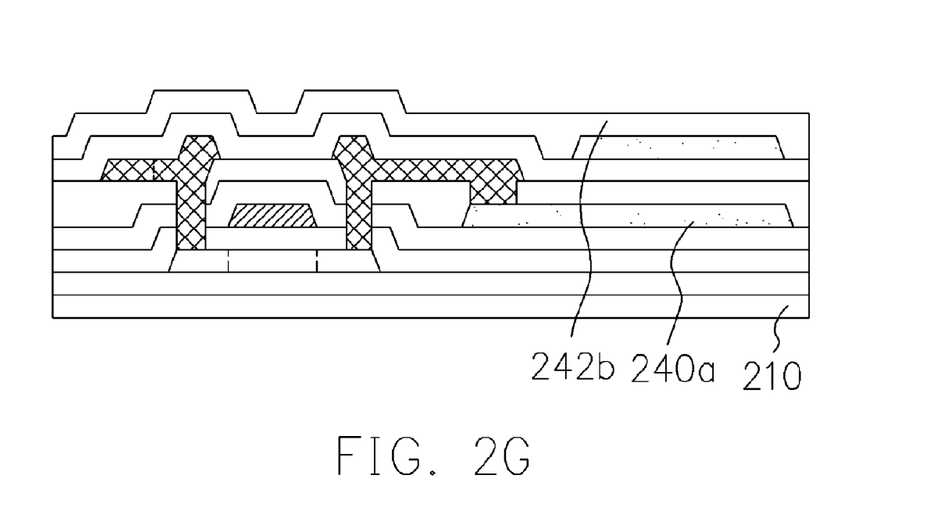

Thereafter, referring to FIG. 2G, for example, a second dielectric layer 242b is formed over the substrate 210 covering the transparent capacitance electrode 240b.

Figure 2H:
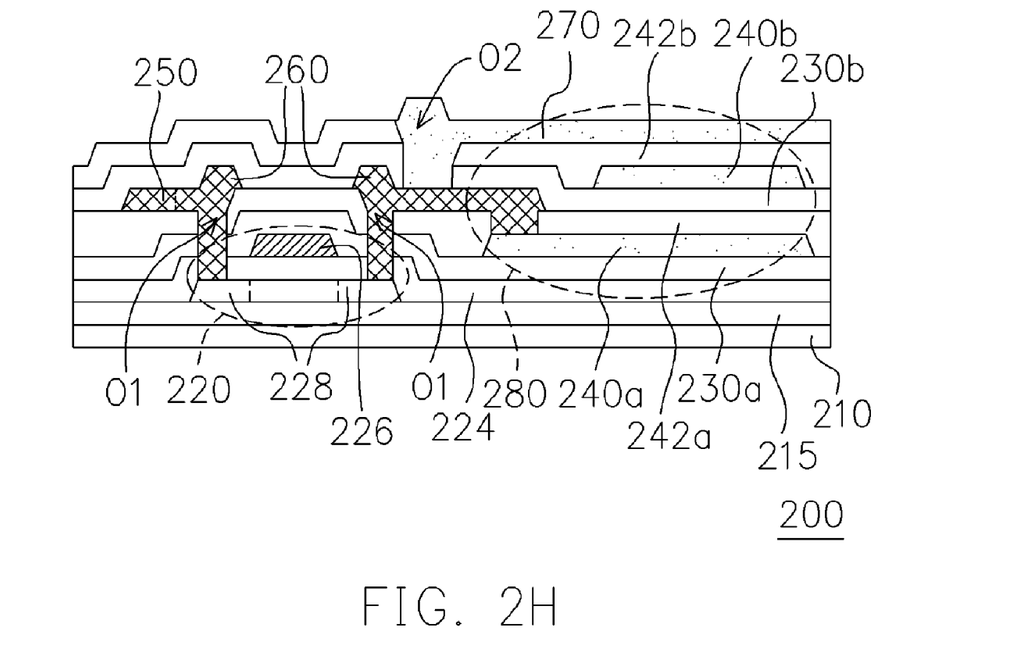

Then, referring to FIG. 2H, for example, a second contact window opening O2 is formed over the source/drain conductive layer 260 by performing conventional photolithography and etching process. Next, a pixel electrode 270 is formed over the second dielectric layer 242b of the transparent capacitance electrode 240b. The pixel electrode 270 is filled within the second contact window opening O2 to electrically connect with the source/drain conductive layer 260. The pixel electrode 270 is electrically connected to the active component 220 via the source/drain conductive layer 260. Thus, the pixel electrode 270 and the transparent capacitance electrodes 240a, 240b constitute a multilayer pixel storage capacitor 280.

Hereinafter, the pixel structure according to an embodiment of the present invention will be described. Referring to FIG. 2G, the pixel structure 200 is disposed over the substrate 210. The pixel structure 200 comprises, for example but not limited to, a substrate 210, a scan line (not shown), a data line 250, an active component 220, a plurality of transparent capacitance electrodes 240a, 240b and a pixel electrode 270. The scan line and the data line 250 are disposed over the substrate 210. The active component 220 is disposed over the substrate 210 adjacent to the intersection of the scan line and the data line 250, and the active component 220 is electrically connected to the scan line and the data line 250. The transparent capacitance electrodes 240a and 240b are disposed over the substrate 210. The pixel electrode 270 is disposed over the transparent capacitance electrodes 240a and 240b, and the pixel electrode 270 is electrically connected to the active component 220. Thus, the pixel electrode 270 and the transparent capacitance electrodes 240a, 240b constitute a multilayer pixel storage capacitor 280.

In an embodiment of the invention, the transparent capacitance electrode 240a is, for example but not limited to, electrically connected to the active component 220. The transparent capacitance electrode 240a may also be electrically connected to the pixel electrode 270, and electrically connected to the active component 220 via the pixel electrode 270. Therefore, in the pixel storage capacitor 280, the transparent capacitance electrode 240a and the pixel electrode 270 are, for example but not limited to, at the same voltage level, and the transparent capacitance electrode 240b is at another voltage level. Therefore, the power consumption of the pixel storage capacitor 280 is reduced.

Moreover, the pixel structure 200 further comprises, for example but not limited to, a source/drain conductive layer 260. The active component 220 is, for example but not limited to, electrically connected to the data line 250 and the pixel electrode 270 via the source/drain conductive layer 260. The pixel electrode 270 and the transparent capacitance electrodes 240a and 240b are composed of, for example but not limited to, indium tin oxide (ITO) or indium zinc oxide (IZO).

Figure 3A:
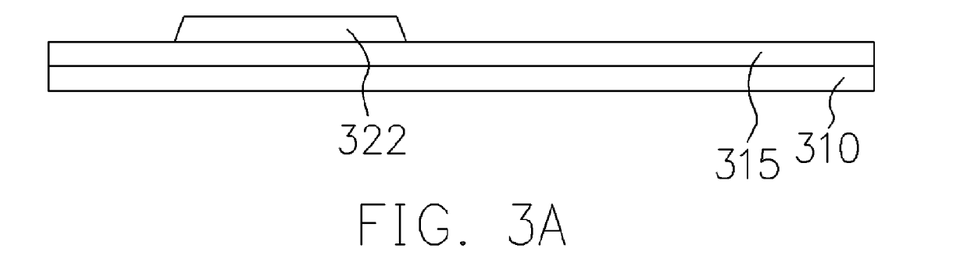
FIG. 3A to 3F are cross-sectional views schematically illustrating a manufacturing process of a pixel structure according to an embodiment of the present invention.
Figure 3B:
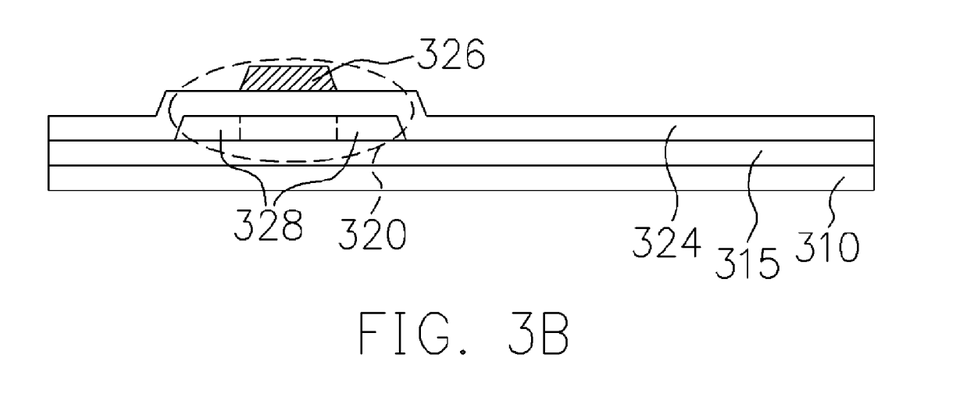

FIG. 3A to 3F are cross-sectional views schematically illustrating a manufacturing process of a pixel structure according to an embodiment of the present invention. Referring to FIG. 3A and FIG. 3B, first of all, an active component 320 and a scan line (not shown) are formed over the substrate 310. The active component 320 comprises, for example but not limited to, a low temperature polysilicon (LTPS) thin film transistor (TFT). The method of forming the active component 320 comprises, for example but not limited to, the following steps. First of all, a polysilicon layer 322 is formed over the substrate 310. In one embodiment of the invention, before the polysilicon layer 322 is formed, for example, a buffer layer 315 is formed over the substrate 310 to prevent the polysilicon layer 322 from ion contamination from the substrate 310. The polysilicon layer 322 is formed by, for example but not limited to, annealing the amorphous silicon (a-Si) layer. Thereafter, for example, an inter-gate dielectric layer 324 is formed over the substrate 310 covering the polysilicon layer 322. Next, for example, a gate 326 over the polysilicon layer 322 is formed over the inter-gate dielectric layer 324. Next, for example, anion implantation process is performed using the gate 326 as a mask to form a doped source/drain region 328 on both sides of the polysilicon layer 322. Moreover, the gate 326 of the active component 320 is electrically connected to the scan line.

Figure 3C:
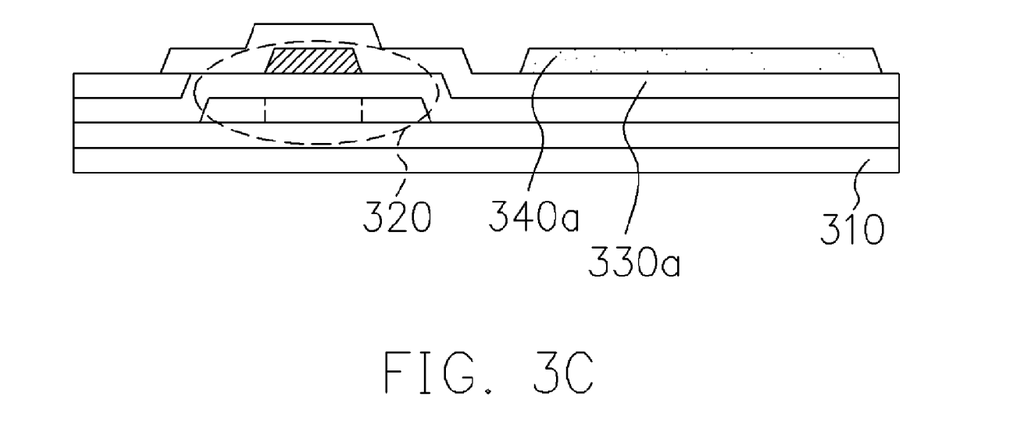

Thereafter, referring to FIG. 3C, for example, a transparent capacitance electrode 340 is formed over the substrate 310. In another embodiment of the invention, before the transparent capacitance electrode 340a is formed, a first protection layer 330a is formed over the substrate 310 covering the active component 320.

Figure 3D:
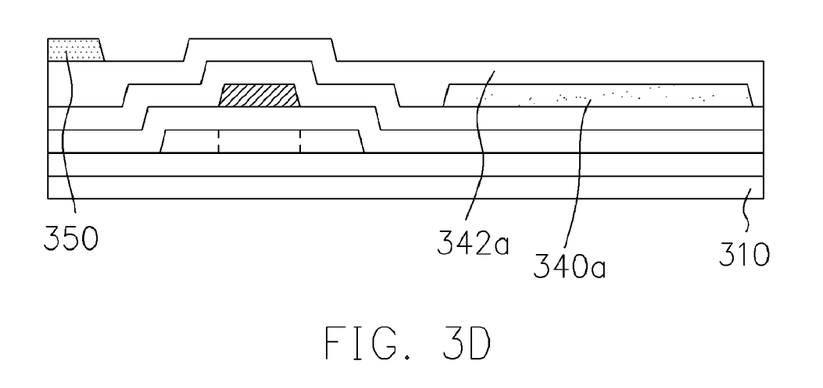

Thereafter, referring to FIG. 3D, for example, a data line 350 is formed over the substrate 310. In another embodiment of the invention, before the data line 350 is formed, a first dielectric layer 342a is formed over the substrate 310 covering the transparent capacitance electrode 340a.

Figure 3E:
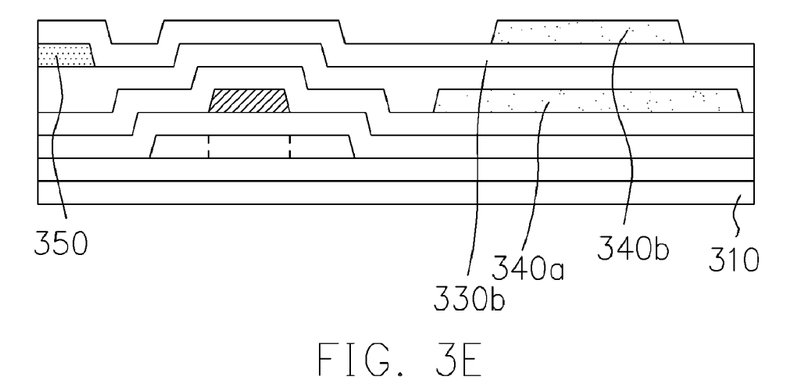

Thereafter, referring to FIG. 3E, another transparent capacitance electrode 340b is formed over the substrate 310 and the transparent capacitance electrode 340a. In another embodiment of the invention, before the transparent capacitance electrode 340b is formed, a second protection layer 330b is formed over the substrate 310 covering the data line 350.

Figure 3F:
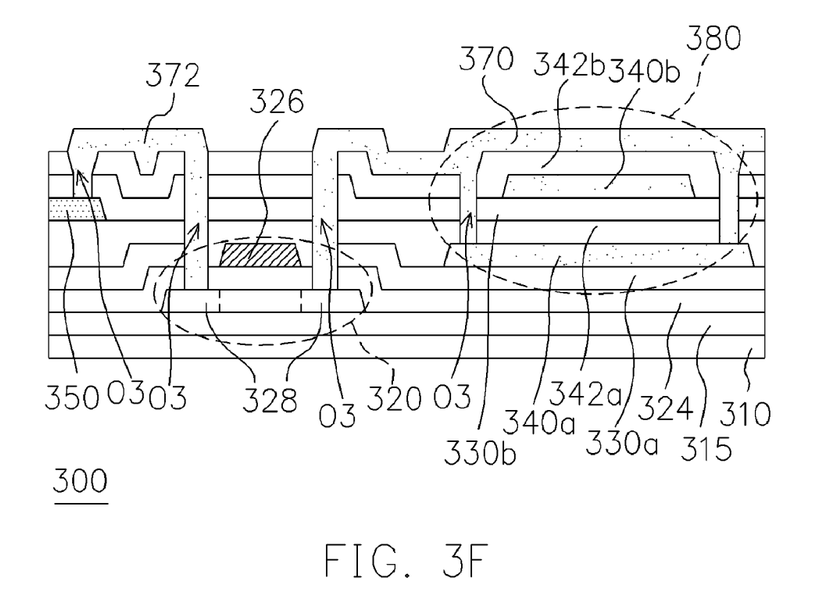

Next, referring to FIG. 3F, for example, a second dielectric layer 342b is formed over the substrate 310 covering the transparent capacitance electrode 340b. Thereafter, for example, a plurality of contact window openings O3 is formed over the doped source/drain region 328, the data line 350 and the transparent capacitance electrode 340a by performing conventional photolithography and etching process. The transparent capacitance electrode 340b is not exposed by the contact window openings O3. Next, a pixel electrode 370 is formed over the second dielectric layer 342b and the transparent capacitance electrode 340b, and a conductive layer 372 is formed over the doped source/drain region 328 and the data line 350 by patterning a transparent material layer. The pixel electrode 370 and the conductive layer 372 is filled within the contact window opening O3. Thus, the pixel electrode 370 is electrically connected to the doped source/drain region 328 of the active component 320, and the conductive layer 372 is electrically connected to the doped source/drain region 328 of the data line 350 and the active component 320. Thus, the pixel electrode 370 and the transparent capacitance electrode 340a, 340b constitute a multilayer pixel storage capacitor 380.

Hereinafter, a pixel structure of the present invention will be described. Referring to FIG. 3F, a pixel structure 300 is formed over the substrate 310. The pixel structure 300 includes a substrate 310, a scan line (not shown), a data line 350, an active component 320, a plurality of transparent capacitance electrodes 340a, 340b and a pixel electrode 370. The scan line and the data line 350 are disposed over the substrate 310. The active component 320 is formed over the substrate 310 adjacent to the intersection of the scan line and the data line 350. The active component 320 is electrically connected to the scan line and the data line 350. The transparent capacitance electrodes 340a and 340b are disposed over the substrate 310. The pixel electrode 370 is disposed over the transparent capacitance electrodes 340a, 340b and electrically connected to the active component 320. Thus, the pixel electrode 370 and the transparent capacitance electrode 340a, 340b constitute a multilayer pixel storage capacitor 380.

In one embodiment of the invention, the transparent capacitance electrode 340a is, for example but not limited to, electrically connected to the pixel electrode 370, and then electrically connected to the active component 320 via the pixel electrode 370. In another embodiment of the invention, the transparent capacitance electrode 340a may also be electrically connected to the active component 320. Therefore, in the pixel storage capacitor 380, the transparent capacitance electrode 340a and the pixel electrode 370 is, for example but not limited to, at the same voltage level, and the transparent capacitance electrode 340b is at another voltage level. Thus, the power consumption of the pixel storage capacitor 380 is reduced.

Moreover, the pixel structure 300 further comprises, for example but not limited to, a conductive layer 372. The active component 320 is, for example but not limited to, electrically connected to the data line 350 via the conductive layer 372, and the pixel electrode 370 is, for example but not limited to, electrically connected to the active component 320 directly. The pixel electrode 370, the conductive layer 372 and the transparent capacitance electrodes 340a, 340b is composed of, for example but not limited to, indium tin oxide (ITO) or indium zinc oxide (IZO).

Figure 4:
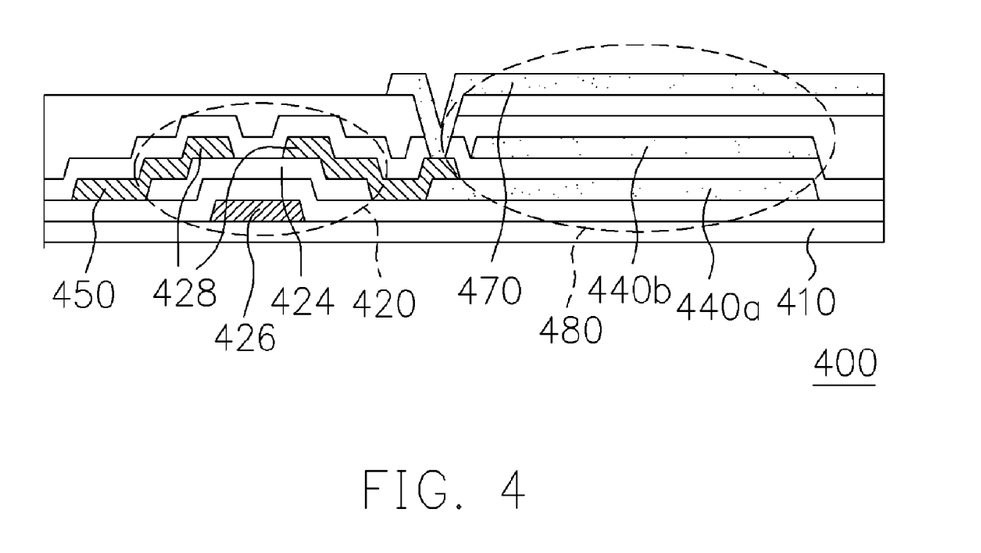
FIG. 4 is a cross-sectional view schematically illustrating a pixel structure according to an embodiment of the present invention.

FIG. 4 is a cross-sectional view schematically illustrating a pixel structure according to an embodiment of the present invention. Referring to FIG. 4, the pixel structure 400 is similar to the embodiments described above except for an amorphous silicon (a-Si) thin film transistor (TFT). In addition, the pixel structure 400 comprises a multilayer structure comprising a transparent pixel storage capacitor 480. The active component 420 of the pixel structure 400 comprises, for example but not limited to, amorphous silicon (a-Si) thin film transistor (TFT). The active component 420 comprises, for example but not limited to, a gate 426, a channel 424 and a source/drain 428. The gate 426 is, for example but not limited to, disposed over the substrate 410 and electrically connected to the scan line (not shown). The channel 424 is, for example but not limited to, disposed over the gate 426. The source/drain 428 is, for example but not limited to, disposed over the channel 424 and electrically connected to the data line 450 and the pixel electrode 470.

Accordingly, in an embodiment of the present invention, the pixel structure comprises a pixel storage capacitor comprising a pixel electrode and a plurality of transparent capacitance electrodes. It should be noted that, the features of pixel structures and the manufacturing methods thereof in the embodiments described above fall within the scope of the present invention.

It should be noted that, the embodiments of the pixel storage capacitor described are not limited to a pixel electrode and two transparent capacitance electrodes. Accordingly, more than two transparent capacitance electrodes can be included to increase the capacitance of the pixel storage capacitor. In addition, by electrically connecting a portion of the transparent capacitance electrodes to the active component directly via the pixel electrode, the number of power lines used by the pixel storage capacitor can be decreased, and a high capacitance can be achieved. For example, in one embodiment of the invention, the pixel electrode is electrically connected to the active component directly without any source/drain conductive layer there-between. Accordingly, a masking process step can be eliminated and therefore the the process time can be reduced and the overall manufacturing process can be reduced.

Accordingly, the pixel structure and the manufacturing method thereof of the present invention have at least the following advantages. First, each capacitance electrode of the pixel storage capacitor are composed of transparent material, thus the aperture ratio of the pixel structure is enhanced drastically. In addition, the multilayer structure pixel storage capacitor has a high capacitance. Moreover, the capacitance is enlarged without increasing the area of the pixel structure, therefore, the invention is suitable applied to a high resolution liquid crystal display (LCD). Further, only one masking process is required for forming the contact window openings for making the connection between the active component with the pixel electrode and the data line, thus the process time can be reduced and the overall cost can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A pixel structure, comprising:
  a scan line, disposed over a substrate;
  a data line, disposed over the substrate;
  an active component, disposed over the substrate adjacent to an intersection of the scan line and the data line, wherein the active component is electrically connected to the scan line and the data line;
  a plurality of transparent capacitance electrodes, disposed over the substrate, wherein the transparent capacitance electrodes comprises at least a first transparent capacitance electrode and at least a second transparent capacitance electrode disposed above the First transparent capacitance electrode; and a pixel electrode, electrically connected to the first transparent capacitance electrode and the active component, wherein at least a first pixel storage capacitor is formed between the first transparent capacitance electrode and the second transparent capacitance electrode, and at least a second pixel storage capacitor parallel connected to the first pixel storage capacitor is formed between the second transparent capacitance electrode and the pixel electrode.

2. The pixel structure of claim 1, wherein a portion of the transparent capacitance electrode is electrically connected to the active component.

3. The pixel structure of claim 1, wherein a portion of the transparent capacitance electrode is electrically connected to the pixel electrode, and electrically connected to the active component via the pixel electrode.

4. The pixel structure of claim 1, wherein the active component comprises a low temperature polysilicon (LTPS) thin film transistor (TFT).

5. The pixel structure of claim 4, further comprising:
a source/drain conductive layer, wherein the active component is electrically connected to the data line and the pixel electrode via the source/drain conductive layer.

6. The pixel structure of claim 4, further comprising:
a conductive layer, wherein the active component is electrically connected to the data line via the conductive layer, and the pixel electrode is electrically connected to the active component.

7. The pixel structure of claim 1, wherein the active component comprises an amorphous silicon (a-Si) thin film transistor (TFT).

8. The pixel structure of claim 7, wherein the active component comprises:
a gate, electrically connected to the scan line;
a channel, disposed over the gate; and
a source/drain, disposed over the channel and electrically connected to the data line and the pixel electrode.

9. The pixel structure of claim 1, wherein a material of the pixel electrode and the transparent capacitance electrode comprise an indium tin oxide (ITO) or an indium zinc oxide (IZO).

10. A manufacturing method, for a pixel structure, comprising:
sequentially forming an active component, a scan line and a data line over a substrate, wherein the active component is electrically connected to the scan line and the data line;
forming a plurality of transparent capacitance electrodes over the substrate, wherein the transparent capacitance electrodes comprises at least a first transparent capacitance electrode and at least a second transparent capacitance electrode formed above the first transparent capacitance electrode; and
forming a pixel electrode over the transparent capacitance electrodes, wherein the pixel electrode is electrically connected to the active component, wherein at least a first pixel storage capacitor is formed between the first transparent capacitance electrode and the second transparent capacitance electrode, and at least a second pixel storage capacitor parallel connected to the first pixel storage capacitor is formed between the second transparent capacitance electrode and the pixel electrode.

11. The manufacturing method of claim 10, wherein the active component comprises a low temperature polysilicon (LTPS) thin film transistor (TFT).

12. The manufacturing method of claim 11, wherein a source/drain conductive layer over the active component during the step of forming the data line, wherein the active component is electrically connected to the data line and the pixel electrode via the source/drain conductive layer.

13. The manufacturing method of claim 11, further comprises a step of forming a conductive layer over the active component after the step of forming the data line, wherein the active component is electrically connected to the data line via the conductive layer, and the pixel electrode is electrically connected to the active component.

14. The manufacturing method of claim 13, wherein the conductive layer and the pixel electrode is formed by patterning a same material layer.

15. The manufacturing method of claim 11, wherein the step of forming the active component comprises:
forming a polysilicon layer over the substrate;
forming an inter-gate dielectric layer over the substrate covering the polysilicon layer;
forming a gate over the inter-gate dielectric layer and the polysilicon layer; and
forming a doped source/drain region in the polysilicon layer on both sides of the gate.

16. The manufacturing method of claim 15, wherein the step of forming the doped source/drain region comprises:
performing art ion implantation process using the gate as a mask to form the doped source/drain region on both sides of the polysilicon layer.

17. The manufacturing method of claim 10, wherein the active component comprises an amorphous silicon (a-Si) thin film transistor (TFT).

18. The manufacturing method of claim 17, wherein the step of forming the active component comprises:
forming a gate over the substrate, wherein the gate is electrically connected to the scan line;
forming an inter-gate dielectric layer over the substrate covering the gate;
forming a channel over the inter-gate dielectric layer, wherein the channel is disposed over the gate; and
forming a source/drain over the channel.

19. The manufacturing method of claim 10, wherein a material of the pixel electrode and the transparent capacitance electrodes comprise an indium tin oxide (ITO) or an indium zinc oxide (IZO).

20. A pixel structure, comprising:
a scan line, disposed aver a substrate;
a data line, disposed over the substrate;
an active component, disposed over the substrate adjacent to an intersection or the scan line and the data line, wherein the active component is electrically connected to the scan line and the data line;
a first transparent capacitance electrode, disposed over the substrate;
a pixel electrode, disposed over the first transparent capacitance electrode and electrically connected to the active component and the first transparent capacitance electrode; and
a second transparent capacitance electrode, disposed between the first transparent capacitance electrode and the pixel, electrode, wherein a multilayer pixel storage capacitor is formed by the pixel electrode, the first transparent capacitance electrode and the second transparent capacitance electrode.

21. The pixel structure of claim 20, wherein the second transparent capacitance electrode is electrically insulating from the first transparent capacitance electrode and the pixel electrode.

22. A pixel structure, comprising:
a scan line, disposed over a substrate;
a data line, disposed over the substrate;
an active component, disposed over the substrate adjacent to an intersection of the scan line and the data line, wherein the active component comprises a gate electrically connected to the scan line, a channel disposed over the gate and a source/drain disposed over the channel and electrically connected to the data line end the pixel electrode;
a protection layer, disposed over the substrate for covering the gate of the active component;
a plurality of transparent capacitance electrodes, disposed aver the substrate, the transparent capacitance electrodes comprising at least a first transparent capacitance electrode and at least a second transparent capacitance electrode disposed above the first transparent capacitance electrode, wherein the first transparent capacitance electrode is disposed on the protection layer; and
a pixel electrode, electrically connected to the first transparent capacitance electrode and the active component, wherein at least a first pixel storage capacitor is formed between the first transparent capacitance electrode and the second transparent capacitance electrode, and at least a second pixel storage capacitor parallel connected to the first pixel storage capacitor is formed between the second transparent capacitance electrode and the pixel electrode.

* * * * *